Patented Jan. 15, 1952

2,582,704

UNITED STATES PATENT OFFICE 2,582,704

REACTION PRODUCTS OF A POLYETHYLENE MELAMINE AND AN ALKYD RESIN

Edward L. Kropa, Old Greenwich, and Henry P. Wohnsiedler, Darien, Conn., assignors to American Cyanamid Company, New York, N. Y., a corporation of Maine No Drawing. Application November 25, 1950, Serial No. 197,639

12 Claims. (Cl. 260—33.2)

This invention relates to the production of new synthetic materials and, more particularly, new resinous compositions which are especially suitable for use in the plastics and coating arts. Still more particularly the invention is concerned with compositions comprising the product of reaction of ingredients comprising (1) a polyethylene melamine (diethylene melamine or triethylene melamine) and (2) an alkyd resin containing unesterified hydroxyl groups. Preferably the alkyd resin is one wherein the amount of polyhydric alcohol used in its preparation is at least 25% in excess of the theoretical amount required for complete esterification of the carboxyl groups of the carboxylic component thereof. Thus, the alkyd resin containing unesterified hydroxyl groups can be one obtained by reaction of ingredients comprising a polyhydric alcohol (e. g., di-, tri-, tetra-, penta- or hexahydric alcohol, or mixtures of any or all of them) and a polycarboxylic acid (or anhydride or polyanhydride), e. g., di-, tri-, tetra-, penta- or hexacarboxylic acid, or available anhydrides or polyanhydrides of such acids, or mixtures of any or all of such acids, anhydrides and polyanhydrides. In all cases, the polyhydric alcohol component is employed in substantial excess so as to assure that the alkyd resin will contain unesterified hydroxyl groups. Instead of diethylene melamine or triethylene melamine alone, a mixture of these polyethylene melamines in any proportions can be used as the reactant with the alkyd resin of (2). The scope of the invention also includes method features.

Triethylene melamine is a known compound and can be prepared, for example, by the method described in Wystrach and Kaiser Patent No. 2,520,619. It can be represented by the following general formula:

I 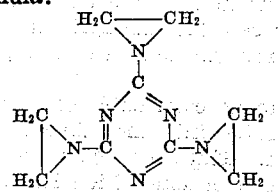

Diethylene melamine can be represented by the following general formula:

II 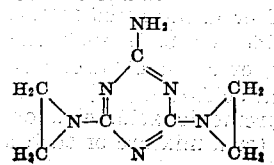

It can be prepared, for instance, as described in the copending application of Donald W. Kaiser and Frederic Schaefer, Serial No. 165,861, filed June 2, 1950. The polyethylene melamines employed in practicing the present invention may be described as being s-triazine (1,3,5-triazine) derivatives wherein at least two of the amino nitrogen atoms of a polyamino-s-triazine each has one ethylene group attached thereto instead of the two hydrogen atoms.

It is an object of the present invention to prepare a new class of synthetic materials, more particularly resinous compositions, which have particular utility in the plastics and coating arts, e. g., as coating, laminating, adhesive, impregnating, casting and molding compositions as well as in other applications, for instance in the treatment of textiles, paper, etc. They also can be used as components of plastics and coating compositions. Other objects of the invention will be apparent to those skilled in the art as the description of the invention proceeds.

The present invention is based on our discovery that new and valuable materials for use in coating, molding and other applications can be prepared by effecting reaction between ingredients comprising (1) diethylene melamine and/or triethylene melamine and (2) an alkyd resin of the kind broadly described in the first paragraph of this specification and more specifically elsewhere herein. When the ingredients are co-reacted only to a relatively low degree or extent, the resulting reaction products generally are soluble, but become insoluble upon further advancement of polymerization, that is, become substantially completely cured. The synthetic compositions of this invention, as initially prepared, are thermosetting in nature and can be cured under heat in the form of films or moldings without the aid of a curing catalyst. The principal reaction which seems to take place between the polyethylene melamine and the alkyd resin containing unesterified hydroxyl groups appears to be one of addition. It also appears that the polyethylene melamines undergo self-polymerization, and this latter type of reaction may compete with the aforementioned addition reaction.

The alkyd resins which are used in practicing the present invention are those which contain unesterified hydroxyl groups. From a practical standpoint it is desirable that a substantial average number of unesterified hydroxyl groups be present in the resin molecule, and such a result can be obtained, for example, by employing an amount of polyhydric alcohol in the preparation of the alkyd resin that is at least 25% in excess of the theoretical amount required for complete esterification of the carboxyl groups of the carboxylic component of the alkyd resin, e. g., 30 or 40 or 50%, or even 75 to 300% or more in excess of the theoretical amount required. For instance, when the polyhydric alcohol used is pentaerythritol, the amount thereof which is employed in making the alkyd resin advantageously is at least 50% in excess of the theoretical amount required for complete esterification of the carboxylic ingredient used in preparing the alkyd resin. The general method of making such alkyd resins is that which is conventional in the art.

Any polyhydric alcohol can be used in making the hydroxy-containing alkyd resins employed in practicing the present invention, and such an alcohol can contain other reactive or functional groups (in addition to —OH groups), as desired or as conditions may require. Thus, polyhydric alcohols can be employed that contain reactive groups such as

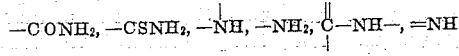

and other groups such as mentioned in our copending application Serial No. 197,637, filed concurrently herewith, with particular reference to nitrogenous compounds used as a reactant with a polyethylene melamine in making a new class of synthetic materials. Examples of such compounds are those derived from glyceric acid, trihydroxy-n-butyric acid, trihydroxy-isobutyric acid, etc., by reaction with ammonia, ethanolamine, diethanolamine, etc.; also, compounds obtained by reaction of cyanuric chloride or aminodichloro-s-triazine with ethanolamine, propanolamine, etc.; and reaction products of melamine or ammeline with ethylene oxide, propylene oxide, etc. The derivatives or products of the kind just mentioned by way of illustration contain at least two hydroxyl groups and one or more other reactive groups of the kind aforementioned.

More specific examples of polyhydric alcohols that can be used in preparing the hydroxy-containing alkyd-resin reactant are:

Ethylene glycol
Diethylene glycol
Triethylene glycol
Tetraethylene glycol
Hexamethylene glycol
Decamethylene glycol
Nonaethylene glycol
Propylene glycol
Dipropylene glycol
Diethanolamine
Triethanolamine
Monoamide of glyceric acid
N-hydroxyethyl glyceric acid amide
Di-(hydroxyethyl) melamine
Tri-(hydroxypropyl) melamine
Di-(hydroxypropyl) ammeline
Di-(hydroxyethyl) urea
Trihydroxy-n-butyramide
Propenylene glycol
Butenylene glycol
2-ethyl-1,3-hexanediol
1,3-butylene glycol
Pentaethylene glycol
Heptaethylene glycol
Octaethylene glycol
Decaethylene glycol
2-butyl-1,3-octanediol (2-butyl - 3 - pentyl - 1,3-propanediol)
2-ethyl-2-methylol-1-hexanol (2-ethyl-2-butyl-1,3-propanediol)
6-methyl-2,4-heptanediol (1-methyl-3-isobutyl-1,3-propanediol)
Glycerol
Erythritol
Pentaerythritol
Dipentaerythritol
Adonitol
Xylitol
Arabitol
Mannitol
Dulcitol
Sorbitol
Polyallyl alcohols (polymeric allyl alcohols), especially those which contain an average of from 4 to 10 hydroxyl groups per molecule.
Etc.

More specific examples of polycarboxylic acids (or anhydrides thereof if available) that can be employed in producing the hydroxy-containing alkyd-resin reactant are: saturated aliphatic polycarboxylic acids, e. g., malonic, succinic, adipic, glutaric, pimelic, sebacic, azelaic, suberic, tricarballylic, citric, etc.; unsaturated aliphatic polycarboxylic acids, e. g., maleic, fumaric, itaconic, citraconic, monohalomaleic (e. g., monochloromaleic), monohalofumaric (e. g., monochlorofumaric), mesaconic, aconitic, acetylene dicarboxylic, etc.; cyclic polycarboxylic acids, more particularly cycloaliphatic polycarboxylic acids such as the cyclopentane dicarboxylic acids, the alkyl cycloalkane polycarboxylic acids, etc.; aromatic polycarboxylic acids, e. g., phthalic, benzoyl phthalic, terephthalic, benzophenone-2,4'-dicarboxylic, chlorinated phthalic acid or anhydride (e. g., tetrachlorophthalic acid or anhydride), etc.; as well as others that will be apparent to those skilled in the art from the foregoing illustrative examples.

It is not essential that a single polyhydric alcohol or a single polycarboxylic acid be used in making the hydroxy-containing alkyd resin, since mixtures of polyhydric alcohols in any proportions (e. g., mixtures of two or more of the aforementioned polyhydric alcohols) or mixtures of polycarboxylic acids, or of anhydrides or polyanhydrides of such acids if available, in any proportions (e. g., mixtures of two or more of the aforementioned polycarboxylic acids) can be used in making the alkyd resin. Mixtures of polycarboxylic acids and of available anhydrides and/or available polyanhydrides thereof in any proportions also can be employed if desired.

Likewise, it is not essential that the hydroxy-containing alkyd resin be produced by a direct esterification reaction, since it is sometimes desirable to produce it by a transesterification reaction between, for example, an alkyl ester of the polycarboxylic acid and the polyhydric alcohol.

Various mono-esterifiable compounds also can be incorporated into the alkyd resin during its preparation. Thus, our hydroxy-containing alkyd resin can be one which has been modified by incorporating therein a saturated or unsaturated, normal or isomeric monohydric alcohol, a saturated or unsaturated monocarboxylic acid or anhydride, or both such mono-esterifiable compounds, or a monohydroxy acid (or a mixture of such acids), e. g., γ-hydroxyvaleric acid, β-hydroxypropionic acid, etc., or a lactone of such acids (or a mixture of such lactones), or a mixture of any or all of such monoesterifiable compounds. Examples of monohydric alcohols that can be used as modifiers of the alkyd-resin reactant are: propyl, isopropyl, butyl, isobutyl, amyl, isoamyl, hexyl, octyl, decyl, dodecyl to octadecyl, inclusive, allyl, methallyl, 1-chloroallyl, 2-chloroallyl, crotyl and cinnamyl alcohols, 3-hydroxy-butene-1, 4-hydroxy-2-pentene, etc. The use of methyl and ethyl alcohols is not precluded, but in general these alcohols are less suitable because of their lower boiling points. As monobasic acids can be employed, for example, saturated or unsaturated, normal or isomeric acids containing only one esterifiable group, e. g., acetic, propionic to stearic, inclusive, benzoic, etc., acids of drying, semi-drying and drying oils, e. g., the acids of tung oil, linseed oil, rapeseed oil, soyabean oil, castor oil, etc. The monoesterifiable compound may be introduced into the esterification product before, during or after esterification of the polyhydric alcohol with the polybasic acid under conditions such that interesterification of the monoesterifiable compound with the incompletely esterified polyhydric alcohol-polybasic acid reaction product is obtained. Of course, in all cases the amount of polyhydric alcohol (or polyhydric alcohol and monohydric alcohol) is substantially in excess of the theoretical amount required for complete esterification of the carboxyl groups of the carboxylic component or components of the alkyd resin.

In general, the hydroxy-containing alkyd resins used in practicing our invention are capable of undergoing polymerization (or further polymerization) and are soluble in organic solvents (e. g., benzene, toluene, ethyl alcohol, ethylene glycol monoethyl ether, etc.). By "soluble in organic solvents" it is not meant that they are soluble in all organic solvents, but that, generally speaking, each is soluble in one or another organic solvent. In general, too, the alkyd resin which we use as a co-reactant with a polyethylene melamine has a relatively low acid number, usually less than about 10 and, in many cases, less than 1, e. g., from zero or substantially zero to 0.9.

The polyethylene melamine and hydroxy-containing alkyd resin are co-reactive (and, therefore, operative) in any and all proportions. Although the polyethylene melamine may constitute a relatively small amount (e. g., from 0.5 to 3%) of the total weight of the polyethylene melamine and alkyd-resin reactants, ordinarily it is desirable that the polyethylene melamine constitute at least about 5% (or, in certain cases, a minimum of about 10 or 15%) of the combined weight of polyethylene melamine and alkyd resin. For certain applications of our new reaction products, it is sometimes desirable that the polyethylene melamine constitute a major or preponderant proportion, by weight, of the mixture thereof with the alkyd resin, e. g., from 55 or 60% to 90 or 95% or more by weight of the mixture. A preferred range of proportions for the usual applications of our new reaction products is, by weight, from 5 to 75% of the polyethylene melamine to from 25 to 95% of the hydroxy-containing alkyd resin. If the proportions are such that there is a theoretical excess of one reactant over the other, such excess remains in the reaction mass and may separately polymerize, forming a mixture with the primary reaction product.

The temperature of the reaction also can be widely varied depending, for instance, upon the particular reactants employed, the rapidity of reaction wanted, the particular properties desired in the reaction product, and other factors. For example, the reaction temperature can be varied from a relatively low temperature of the order of 50° or 60° C. up to and including the fusion or boiling temperature of the reaction mixture if the reaction is carried out in the absence of an active or inert liquid medium, or up to and including the boiling point of the reaction mass if the reaction is effected while the primary reactants are dissolved or suspended in such a liquid medium.

The reaction can be effected in the absence of a solvent or other additive, or in the presence of (i. e., intimately associated with) an inert solvent (e. g., benzene, toluene, xylene, dioxane, acetone, ethyl methyl ketone, methyl isobutyl ketone, chlorobenzene, chloroform, ethyl acetate, carbon tetrachloride, methylene dichloride, ethylene dichloride, etc.), or in the presence of an active liquid medium, that is, one which is capable of entering into the reaction, more particularly with the polyethylene melamine reactant, for instance alcohols represented by the formula R—OH, where R represents a monovalent hydrocarbon radical, e. g., methyl, ethyl, propyl, benzyl, tolyl, phenyl, allyl and others such as are mentioned by way of illustration in our copending application Serial No. 197,638, filed concurrently herewith, where reference is made to monohydric alcohols represented by the formula R—OH. Examples of active liquid media that can be used include methanol, ethanol, propanol, butanol, pentanol, hexanol, allyl alcohol, methallyl alcohol, benzyl alcohol and other monohydric acohols, including those belonging to the saturated and unsaturated aliphatic and aromatic-substituted aliphatic series; the various liquid alcohol-ethers, for example, ethylene glycol monomethyl ether, ethylene glycol monoethyl ether, diethylene glycol monomethyl ether, diethylene glycol monoethyl ether, etc.; as well as numerous others that will be apparent to those skilled in the art.

The inert or active liquid medium or additive, if employed, can be used in any suitable amount ranging, for instance, from 0.1 to 40 or 50 times that of the weight of the primary reactants. For example, the inert or active liquid medium can be used in an amount such that the primary reactants constitute from about 10% to about 30 or 35% by weight of the reaction mass. At the end of the reaction period, the inert or unreacted liquid medium can be removed, if desired, from the reaction mass by any suitable means, for instance by distillation, decantation, etc.; or the solid reaction product can be separated from the liquid component of the reaction mass by filtration, centrifuging, etc.; or, in some cases, as for instance in the preparation of a coating composition or a component of such a composition, part or all of the inert or unreacted liquid medium can be allowed to remain in the reaction mass, thereby to produce a coating composition of a desired concentration of resin solids.

In order that those skilled in the art better may understand how the present invention can be carried into effect, the following examples are given by way of illustration and not by way of limitation. All parts and percentages are by weight.

EXAMPLE 1

A

|  | Parts | Approx. Molar Ratio |
|---|---|---|
| Glycerol | 1,017 | 11 |
| Adipic acid | 1,020 | 7 | are heated together, with stirring and with provision for the removal of water, the temperature being raised slowly to 225° C. The reaction mass is held at this temperature for approximately 3 hours, yielding an alkyd resin containing unesterified hydroxyl groups and having an acid number of 4. This resin is an easily pourable liquid and is soluble in a 1–1 mixture of ethyl alcohol and water. It is used as a co-reactant with triethylene melamine as described below:

B

|  | Parts |
|---|---|
| Alkyd resin of A | 90 |
| Triethylene melamine | 10 |
| Ethylene glycol monoethyl ether | 400 |

The triethylene melamine is dissolved in the solvent, after which the alkyd resin is added thereto. The resulting mixture is heated with stirring under reflux at boiling temperature for from 1 to 2 hours, yielding a solution containing the triethylene melamine-alkyd resin reaction product. This solution is filtered to remove any insoluble matter. Flexible films are obtained by baking panels coated with the filtered solution for from 2 to 3 hours at 120°–150° C.

EXAMPLE 2

A

|  | Parts | Approx. Molar Ratio |
|---|---|---|
| Ethylene glycol | 124 | 2 |
| Sebacic acid | 202 | 1 |

A mixture of the above ingredients is heated with stirring, under conditions allowing for the discharge of water, at a slowly rising temperature over a period of 3 hours to 225° C. The reaction mass is then held at this temperature for about 7 hours in order to complete the reaction. The resulting alkyd resin contains unesterified hydroxyl groups and has an acid number of about 2. It is a soft, wax-like material with a softening point of 60°–65° C.

B

|  | Parts |
|---|---|
| Alkyd resin of A | 75 |
| Triethylene melamine | 25 |
| 1:1 volume mixture of acetone and ethyl alcohol | 300 | are heated together under reflux at boiling temperature, while stirring the reaction mass, for from 3 to 4 hours. After filtering the solution of the resulting reaction product, portions thereof are flowed upon glass and metal panels. The excess is allowed to drain off at room temperature, after which the panels are baked for about 3 or 4 hours at about 130° C. Flexible, tough films having good surface-protective characteristics are formed on the panels.

EXAMPLE 3

A

|  | Parts | Approx. Molar Ratio |
|---|---|---|
| Glycerol | 581 | 2 |
| Phthalic anhydride | 444 | 1 | are heated together, with provision made for the discharge of water resulting from the condensation reaction, to a temperature or 215° C., and the reaction is then allowed to proceed at 215°–225° C. for a total of 4 hours. A very viscous resin containing unesterified hydroxyl groups and having an acid number of 9 is obtained. This resin is soluble in ethyl alcohol and in a 1–1 mixture of water and ethyl alcohol, and can be thinned with water to the extent of 60 grams thereof per 100 grams of resin. It is co-reacted with triethylene melamine as described below:

B

|  | Parts |
|---|---|
| Alkyd resin of A | 50 |
| Triethylene melamine | 50 |
| Ethyl alcohol | 300 |

The same procedure is followed as described under Example 2. As in that example, so too in this example the triethylene melamine reacts partly with the ethyl alcohol and partly with the alkyd resin through their respective hydroxy groups. Baked films produced by heating panels coated with the liquid reaction product are somewhat harder than films obtained by similarly baking the product of Example 2, and form good surface-protective coatings on the panels.

EXAMPLE 4

Same as in Example 1 with the exception that 10 parts of diethylene melamine instead of triethylene melamine is used as a co-reactant with the alkyd resin of A. Similar results are obtained.

EXAMPLE 5

Same as in Example 1 with the exception that the alkyd resin used as a co-reactant with triethylene melamine is one obtained by reaction of propylene glycol, fumaric acid and phthalic anhydride in the ratio of 7.5 moles propylene glycol, 4 moles fumaric acid and 2 moles phthalic anhydride, these ingredients being heated together at about 85°–95° C. under anhydrous reflex conditions until an organic solvent-soluble alkyd resin having an acid number of about 10 is obtained. A product similar to that of Example 1 is obtained.

EXAMPLE 6

A

|  | Parts | Approx. Molar Ratio |
|---|---|---|
| Glycerol | 291 | 1.53 |
| Sebacic acid | 404 | 1.0 | are heated together, under conditions allowing for the discharge of water, for 3½ hours at a temperature ranging from 220° C. to 330° C., thereby yielding a very viscous, liquid resin containing unesterified hydroxyl groups and having an acid number of 4. Because of the ratio of the proportions of ingredients employed in this and other examples herein, the reaction mixture can be heated freely without danger of gelation during the reaction period. This resin is used as a co-reactant with diethylene melamine in the manner described below:

B

| | Parts |
|---|---|
| Alkyd resin of A | 25 |
| Diethylene melamine | 75 |
| Ethylene glycol monoethyl ether | 200 |

The same procedure is followed as described under Example 2 with the exception that the mixture of reactants is heated for only about 1 to 1½ hours at about 130°–140° C. When portions of the resulting solution are cast to form films, hard films are obtained after heating for 3 hours at 65° C. and then for 1½ hours at 150° C.

EXAMPLE 7

Same as in Example 6 with the exception that 50 parts each of triethylene melamine and of the same alkyd resin employed in Example 6 are used in place of 75 parts of triethylene melamine and 25 parts of alkyd resin. Similar results are obtained.

EXAMPLE 8

In this example the alkyd resin containing unesterified hydroxyl groups is prepared by a transesterification reaction.

A

| | Parts | Approx. Molar Ratio |
|---|---|---|
| Pentaerythritol | 735 | 3 |
| Dibutyl sebacate | 1,130 | 2 |

All of the pentaerythritol and 150 parts of the dibutyl sebacate are heated together with stirring in a reaction vessel which is connected to a water-cooled condenser for condensing the butyl alcohol formed as a by-product of the reaction. After heating for about 65 minutes at about 226°–228° C., a clear solution results. The remainder of the dibutyl sebacate is now slowly added over a period of about 3¾ hours while continuing to heat the reaction mass at about 226°–241° C. After heating for an additional 10 minutes, vacuum is applied for about 20 minutes. The total amount of butyl alcohol collected is about 96% of the theoretical. The product is a light-colored, soft, plastic material having an acid number of 0.11.

B

| | Parts | Approx. Molar Ratio |
|---|---|---|
| Alkyd resin of A | 205 | 0.375 |
| Triethylene melamine | 150 | 1.0 |
| Ethylene glycol monoethyl ether | 660 | |

A reaction vessel provided with a reflux condenser and containing a mixture of the above ingredients is placed in a heated oil bath, the mixture being brought to reflux temperature in 15 minutes. Heating under reflux is continued for 45 minutes, the temperature of the reaction mass being about 125° C. at the end of the reflux period. The solution contains a considerable amount of flocculent, insoluble reaction product.

A sample of the solution comprising a reaction product of the aforementioned ingredients is air-dried on a glass plate, yielding an elastomeric, translucent film.

The flocculent reaction product is separated from the solution and dried. Samples of the dried material yield soft, elastic articles when molded at about 155° C. under a pressure of about 4000 pounds per square inch.

Examples 9 and 10 illustrate the use of an alcohol-reaction product of a polyethylene melamine, specifically a methanol-reaction product of triethylene melamine, as a means of introducing a polyethylene melamine into an alkyd resin which initially contains unesterified hydroxyl groups.

EXAMPLE 9

A

PREPARATION OF A REACTION PRODUCT OF TRIETHYLENE MELAMINE AND METHYL ALCOHOL

| | Parts |
|---|---|
| Triethylene melamine | 60 |
| Methyl alcohol | 180 | are heated together under reflux at the boiling temperature of the mass for 2 hours and 40 minutes, after which the solution of the reaction product is pressure-filtered to remove insoluble material that is present. When a sample of this solution is air-dried it yields a clear, resinous film. The solution is used as a co-reactant with a hydroxy-containing alkyd resin as described under C.

B

PREPARATION OF ALKYD RESIN

| | Parts | Approx. Molar Ratio |
|---|---|---|
| Propylene glycol (propanediol-1,2) | 50.7 | 2 |
| Fumaric acid | 38.7 | 1 |

An alkyd resin containing unesterified hydroxyl groups is prepared by heating a mixture of the above ingredients for 3½ hours at 140°–192° C., the mixture being brought to a temperature of 140° C. in 30 minutes and to a higher temperature of the order of 180°–190° C. in another hour. At the end of the reaction period the cool alkyd resin is a somewhat stiff, translucent, plastic material.

C

PREPARATION OF REACTION PRODUCT OF A AND B

| | Parts |
|---|---|
| Triethylene melamine-methanol reaction product of A | [1] 14.0 |
| Solution of propylene glycol fumarate of B in equal parts by volume of benzene and alcohol | [2] 5.5 |

[1] About 4.7 parts was triethylene melamine in reacted form.
[2] About 5.5 parts of the solution was propylene glycol fumarate.

The above ingredients are first mixed at room temperature. The resulting partially reacted mixture is poured onto a glass plate and heated at 90° C. for about 1 hour. Further polymerization occurs, yielding a moderately tough resin.

EXAMPLE 10

A

Same as in A of Example 9.

B

PREPARATION OF ALKYD RESIN

| | Parts | Approx. Molar Ratio |
|---|---|---|
| β-propiolactone | 54 | 3 |
| Glycerol | 23 | 1 |
| Dioxane | 75 | |

An alkyd resin containing unesterified hydroxyl groups is prepared by heating a mixture of the above ingredients under reflux for approximately 2 hours at the boiling temperature of the mass. The resulting resin is used as a reactant with the triethylene melamine-methanol reaction product of A as described below:

(a)

| | Parts |
|---|---|
| Triethylene melamine - methanol reaction product of A | 60 |
| Alkyd resin of B | 40 |

(b)

| | Parts |
|---|---|
| Triethylene melamine - methanol reaction product of A | 10 |
| Alkyd resin of B | 90 |

The clear solutions that result from mixing the above ingredients in the specified proportions are flowed on glass plates, air-dried for about 16 hours and then baked for about 4 hours at 105° C. The film of (a) is hard, almost water-white in color and is barely scratchable at the end of this baking period. When it is baked for an additional hour at 150° C., the film is further hardened and is practically unaffected when immersed in water at room temperature for 2 hours. The film of (b) is somewhat tacky at the end of the 4-hour baking period at 105° C. but can be hardened by further heating at 150° C. When the alkyd resin of B alone is similarly baked on a panel, the baked film is soft and very tacky.

It will be understood, of course, by those skilled in the art that our invention is not limited to the specific reactants, proportions thereof and conditions of reaction given by way of illustration in the foregoing examples. For instance, in any of the examples wherein diethylene melamine has been used, we can employ an equivalent amount of triethylene melamine; also, in any of the examples wherein triethylene melamine has been utilized, we can use an equivalent amount of diethylene melamine; furthermore, in any of the examples wherein a single polyethylene melamine has been used, we can employ in lieu thereof a mixture of diethylene melamine and triethylene melamine in any proportions, as will be apparent to those skilled in the art.

Likewise, hydroxy-containing alkyd resins other than those employed in the particular examples can be used as the co-reactant with the polyethylene melamine in producing the new synthetic materials of the present invention. Examples of such alkyd resins are those produced by reaction of the following ingredients using proportions thereof such that the amount of polyhydric alcohol is substantially in excess, more particularly at least 25% in excess, of the theoretical amount required for complete esterification of the carboxyl groups of the carboxylic component of the alkyd resin:

Glycerine and succinic acid
Triethylene glycol and sebacic acid
Pentaerythritol and adipic acid
Hexamethylene glycol and phthalic anhydride
Pentaerythritol, butyl alcohol and azelaic acid
Glycerine, linseed oil fatty acids and phthalic anhydride
Glycerine, diethylene glycol, sebacic acid and phthalic anhydride
Ethylene glycol and maleic anhydride
Glycerine and maleic anhydride
Diethylene glycol, maleic anhydride and phthalic anhydride
Diethylene glycol and itaconic acid
Ethylene glycol, maleic anhydride and succinic acid
Ethylene glycol, itaconic acid and phthalic anhydride
Diethylene glycol, maleic anhydride and tung oil acids
Ethylene glycol, maleic anhydride, linseed oil acids and phthalic anhydride
Diethylene glycol and maleic anhydride
Ethylene glycol, maleic anhydride and stearic acid
Diethylene glycol, maleic anhydride and decyl alcohol
Ethylene glycol, maleic anhydride, octyl alcohol and acetic anhydride
Diethylene glycol, fumaric acid, tetrahydroabietyl alcohol and linseed oil fatty acids
Alpha-propylene glycol and maleic anhydride
Diethylene glycol, fumaric acid and benzyl alcohol
Diethylene glycol, fumaric acid and tetrahydroabietyl alcohol
Ethylene glycol, fumaric acid and omega-hydroxydecanoic acid
Fumaric acid, diethylene glycol and linseed oil fatty acid monoglycerides
Etc.

Illustrative examples of ingredients that can be used in a similar preparation of other hydroxy-containing alkyd resins are given, for example, in Kropa Patent No. 2,510,503, for instance in column 15, lines 26—36. Mixture of different hydroxy-containing alkyd resins in any proportions can be used if desired.

The reaction between the polyethylene melamine and the hydroxy-containing, saturated or unsaturated alkyd resin can be carried out in the presence of (i. e., in intimate contact with) active media, preferably an active, normally liquid media, such as a monohydroxy compound. The monohydroxy compound can be, for instance, a compound represented by the general formula R—OH or by the general formula $$R'—(OR'')_n—OH$$

In these formulas R and R' each represents a monovalent hydrocarbon radical, R'' represents a member of the class consisting of divalent aliphatic hydrocarbon radicals and divalent aromatic-substituted aliphatic hydrocarbon radicals, and $n$ represents any positive integer, e. g., 1, 2, 3, 4, 5, 10, 20, 50, 100 or any higher number, the limit on the value of $n$ being governed only by the type of product wanted and the availability of the alcohol-ethers represented by the formula. Mixtures of monohydric alcohols represented by the aforementioned formulas can be used if desired. The hydroxy group in the compounds represented by the above formulas can be attached to a primary, secondary or tertiary carbon atom.

Illustrative examples of radicals represented by R in the formula R—OH and R' in the formula R'—(OR'')$_n$—OH are: monovalent aliphatic hydrocarbon radicals, e. g., methyl, ethyl, propyl, isopropyl, n-butyl, sec.-butyl, tert.-butyl, n-amyl, isoamyl, tert.-amyl, hexyl, heptyl, octyl, nonyl, decyl to octadecyl, inclusive, allyl, methallyl, ethallyl, crotyl, butenyl, isobutenyl, 2-butenyl, butynyl, oleyl, linalyl, etc., including cycloaliphatic, e. g., cyclopentyl, cyclopentenyl, cyclohexyl, cyclohexenyl, cycloheptyl, etc.; monovalent aromatic-substituted aliphatic hydrocarbon radicals, e. g., benzyl, cinnamyl, phenylethyl, phenylpropyl, phenylallyl and other aryl-substituted aliphatic hydrocarbon radicals corresponding to the examples of the monovalent unsubstituted aliphatic hydrocarbon radicals just mentioned; monovalent aromatic hydrocarbon radicals, e. g., phenyl, diphenyl or xenyl, naphthyl, etc.; and monovalent aliphatic-substituted aromatic hydrocarbon radicals, e. g., tolyl, xylyl, ethylphenyl, propylphenyl, isopropylphenyl, allylphenyl, etc. In brief, R and R' each represents any hydrocarbon radical including the lower alkyl radicals, e. g., methyl, ethyl, propyl, butyl, etc.

Illustrative examples of divalent radicals represented by R'' in the above formula for an alcohol-ether are: divalent aliphatic hydrocarbon radicals and divalent aromatic-substituted aliphatic hydrocarbon radicals corresponding to the examples of monovalent aliphatic hydrocarbon radicals and monovalent aromatic-substituted aliphatic hydrocarbon radicals mentioned above with reference to R and R'. Thus, R'' can represent divalent radicals such, for instance, as divalent aliphatic hydrocarbon radicals, e. g., ethylene, propylene (trimethylene), propenylene, butylene, isobutylene, pentylene, isopentylene, butenylene, hexylene, heptylene, octylene, nonylene, decylene to octadecylene, inclusive, including divalent cycloaliphatic hydrocarbon radicals, e. g., cyclopentylene, cyclohexylene, cyclohexenylene, cycloheptylene, etc.; and divalent aromatic-substituted aliphatic hydrocarbon radicals, e. g., phenylethylene, phenylpropylene, naphthylisobutylene, xylylene, etc.

More specific examples of hydroxy compounds that can be used as media in which the reaction between the primary or main reactants is effected, and whereby modification of the fundamental reaction product is secured, are listed below:

Methyl alcohol
Pentanol-2
Hexanol-3
Phenylmethylcarbinol
Diisopropylcarbinol
Lauryl alcohol
Cyclobutanol
Methylcyclobutanol
Cyclohexanol
Ethylene glycol monobutyl ether
Diethylene glycol monoethyl ether
Propylene glycol monophenyl ether Reference is made to our copending application Serial No. 197,638, filed concurrently herewith, for additional examples of hydroxy compounds that can be used as reaction media or modifiers in practicing the present invention.

The reaction between the polyethylene melamine and the hydroxy-containing alkyd resin can be accelerated in some cases by using a small amount of a catalyst or a catalytic reactant to accelerate the reaction. Alkali-metal hydroxides, e. g., sodium or potassium hydroxide, etc., can be used for this purpose. In practicing the present invention we also can use a catalytic reactant such as an amine, e. g., n-butylamine, when the reaction between the polyethylene melamine and the hydroxy compound does not proceed as rapidly as is desired. Other amines (as well as other nitrogenous compounds) that can be used for this purpose are given in our copending application Serial No. 197,637. Such nitrogenous compounds (amines, amides, etc.) also can be employed as a component of the reaction mass in proportions in excess of the amount normally used as a catalyst for the reaction, for instance, in a molar amount equal to or greater than the amount of hydroxy reactant employed. Or, a catalytic amount of the nitrogenous compounds may be employed, e. g., from 0.01 to 20 mole per cent of the polyethylene melamine reactant.

The properties of the fundamental reaction products, more particularly resinous reaction products, of this invention can be varied widely by introducing other modifying bodies before, during or after effecting reaction between the primary components. For instance, we can incorporate into the fundamental reaction products, during their preparation or after they have been formed, such modifiers as melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with urea-formaldehyde resins, melamine-formaldehyde resins, fatty oil or fatty oil acid-modified alkyd resins, or other film-forming materials commonly used in protective coating compositions or mixtures thereof. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example in Moore Patent No. 2,218,474, issued October 15, 1940.

Dyes, pigments, driers, curing agents (in some cases where a more accelerated cure is desired), plasticizers, mold lubricants, opacifiers and various fillers (e. g., wood flour, glass fibers, asbestos, mineral wool, mica dust, powdered quartz, titanium dioxide, zinc oxide, talc, China clay, carbon black, etc.) may be compounded by conventional practice with the synthetic materials of our invention, as desired or as conditions may require, in order to provide a coating, molding or other composition best adapted to meet a particular service use. For additional and more detailed information concerning the modifying ingredients that may be employed in producing coating compositions from our new resins, reference is made to the aforementioned Moore patent.

The modified and unmodified reaction products, more particularly resinous reaction products, of this invention have a wide variety of uses. For example, in addition to their use in the production of coating and molding compositions, they may be employed as modifiers of other natural and synthetic resins, numerous examples of which have been given hereinbefore. The soluble resins of this invention also can be dissolved in appropriate solvents. Some of the solvents that may be employed to dissolve a particular reaction product of our invention include benzene, toluene, xylene, amyl acetate, butanol, methyl ethyl ketone, etc. The dissolved resins can be used as laminating varnishes in the production of laminated articles wherein sheet materials, e. g., paper, cloth, sheet asbestos, etc., are coated or coated and impregnated with the resin solution, superimposed and thereafter united under heat and pressure. They also can be employed as an adhesive in making laminated plywood, as an impregnant of pulp preforms from which molded articles thereafter are made by subjecting the impregnated preform to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also can be used for treating textile materials (e. g., cotton, linen, rayon and other cellulose-containing textiles, wool, silk and other natural or synthetic proteinaceous materials, including nylon and textiles derived from polyacrylonitrile and acrylonitrile copolymers, and from casein, soyabeans, etc.), in filament, thread, yarn, fabric (woven or felted) or other form, in order to improve the properties of such textile materials, e. g., to increase the stiffness, to increase the service life, to impart shrinkage resistance thereto, or otherwise to improve the properties of the treated materials and to make them more useful or serviceable to the ultimate user. They also may be employed for treating leather in order to improve its appearance and physical properties.

We claim:

1. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) an alkyd resin containing unesterified hydroxyl groups, the amount of polyhydric alcohol used in the preparation of said alkyd resin being at least 25% in excess of the theoretical amount required for complete esterification of the carboxyl groups of the carboxylic component of the said alkyd resin.

2. A composition as in claim 1 wherein the polyethylene melamine of (1) is diethylene melamine, the formula for which is

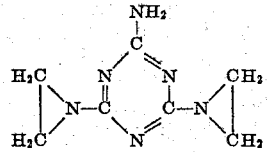

3. A composition as in claim 1 wherein the polyethylene melamine of (1) is triethylene melamine, the formula for which is

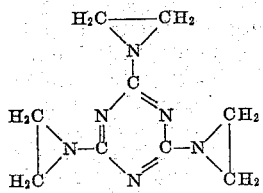

4. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) an alkyd resin containing unesterified hydroxyl groups and which is obtained by reaction of ingredients comprising a dihydric alcohol and a polycarboxylic acid, the amount of dihydric alcohol being at least 25% in excess of the theoretical amount required for complete esterification of all the carboxyl groups of the polycarboxylic acid.

5. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) an alkyd resin containing unesterified hydroxyl groups and which is obtained by reaction of ingredients comprising a trihydric alcohol and a polycarboxylic acid, the amount of trihydric alcohol being at least 25% in excess of the theoretical amount required for complete esterification of all the carboxyl groups of the polycarboxylic acid.

6. A composition comprising the product of reaction of ingredients comprising (1) a polyethylene melamine which is a polyamino-s-triazine wherein at least two of the amino nitrogen atoms each has one ethylene group attached thereto instead of the two hydrogen atoms and (2) an alkyd resin containing unesterified hydroxyl groups, the polyhydric alcohol component of the said alkyd resin being pentaerythritol and the amount of pentaerythritol used in the preparation of said alkyd resin being at least 50% in excess of the theoretical amount required for complete esterification of the carboxyl groups of the carboxylic component of the said alkyd resin.

7. A composition comprising the product of reaction of (1) triethylene melamine, the formula for which is

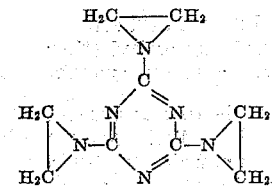

and (2) an alkyd resin containing unesterified hydroxyl groups, the polyhydric alcohol and the polycarboxylic acid components of the said alkyd resin being pentaerythritol and sebacic acid, respectively, in the ratio of approximately 1.5 moles of the former per mole of the latter.

8. The method of preparing a new synthetic material which comprises effecting reaction between ingredients comprising (1) a polyethylene melamine which is a polyamino-s-triazine wherein at least two of the amino nitrogen atoms each has one ethylene group attached thereto instead of the two hydrogen atoms and (2) an alkyd resin containing unesterified hydroxyl groups, the amount of polyhydric alcohol used in the preparation of said alkyd resin being at least 25% in excess of the theoretical amount required for complete esterification of the carboxyl groups of the carboxylic component of the said alkyd resin.

9. A method as in claim 8 wherein the reaction between the ingredients of (1) and (2) is effected in the presence of a monohydric alcohol.

10. A method as in claim 8 wherein the reaction between the ingredients of (1) and (2) is effected in the presence of an alcohol-ether represented by the formula $R'-(OR'')_n-OH$ where $R'$ represents a monovalent hydrocarbon radical, $R''$ represents a member of the class consisting of divalent aliphatic hydrocarbon radicals and divalent aromatic-substituted aliphatic hydrocarbon radicals, and $n$ represents a positive integer.

11. A method as in claim 10 wherein the alcohol-ether is ethylene glycol monomethyl ether.

12. A method as in claim 8 wherein the reaction is effected by heating a liquid medium containing the ingredients of (1) and (2) and in which the said ingredients are inert, said reaction being effected at a temperature not exceeding the boiling temperature of the reaction mass.

EDWARD L. KROPA.
HENRY P. WOHNSIEDLER.

REFERENCES CITED

The following references are of record in the file of this patent:

UNITED STATES PATENTS

| Number | Name | Date |
|---|---|---|
| 2,524,727 | Dudley | Oct. 3, 1950 |

OTHER REFERENCES

Smith, Synthetic Fiber Developments in Germany (Textile Research Institute) 1946 pp. 27–29.